(12) United States Patent
Isoda

(10) Patent No.: US 6,444,997 B2
(45) Date of Patent: Sep. 3, 2002

(54) RADIATION IMAGE READ-OUT APPARATUS

(75) Inventor: Yuji Isoda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 6 days.

(21) Appl. No.: 09/808,103

(22) Filed: Mar. 15, 2001

(30) Foreign Application Priority Data

Mar. 15, 2000 (JP) ........................................ 2000-072283

(51) Int. Cl.$^7$ ........................... G01T 1/161; G03B 42/08
(52) U.S. Cl. ........................ 250/587; 250/584; 250/586; 250/582; 250/484.4
(58) Field of Search ................................. 250/581, 582, 250/583, 584, 585, 586, 484.4, 208.1; 348/222, 224, 241, 587

(56) References Cited

U.S. PATENT DOCUMENTS

| 4,816,679 A | 3/1989 | Sunagawa et al. | ....... 250/327.2 |
| 6,373,074 B1 * | 4/2002 | Mueller et al. | ............. 250/584 |

FOREIGN PATENT DOCUMENTS

| JP | 60-11568 | 1/1985 | ............... C09J/3/14 |
| JP | 60-236354 | 11/1985 | ............ H04N/1/04 |
| JP | 1-101540 | 4/1989 | ........... G03B/42/02 |

* cited by examiner

Primary Examiner—Constantine Hannaher
Assistant Examiner—Timothy Moran
(74) Attorney, Agent, or Firm—Sughrue Mion, PLLC

(57) ABSTRACT

A radiation image read-out apparatus including a lens array and a line sensor for reading an image recorded on a stimulable phosphor sheet provides a read-out image of high quality which is free from a spurious pattern due to non-aperture regions of the lens array. A first memory stores an image signal representing the image recorded on the stimulable phosphor sheet. Spurious pattern signal calculating means calculates a spurious pattern signal based on positions of the non-aperture regions on the lens array. The spurious pattern signal is stored in a second memory. Image modification means reads the image signal and the spurious pattern signal from the first and second memories to calculate a processed image signal free from any spurious pattern signal on a pixel-by-pixel basis. The spurious pattern signal may instead be obtained by causing the apparatus to read a uniform radiation image recorded on the stimulable phosphor sheet.

24 Claims, 11 Drawing Sheets

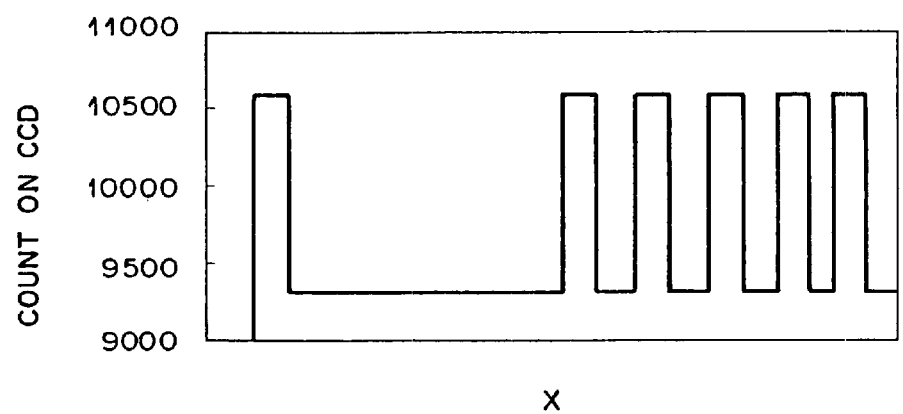
F I G. 5

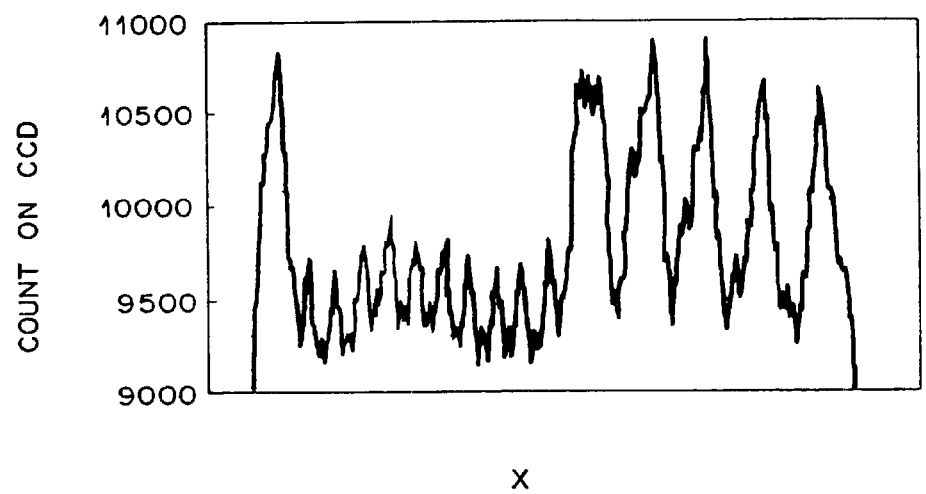
F I G. 6

S2 
F I G . 7

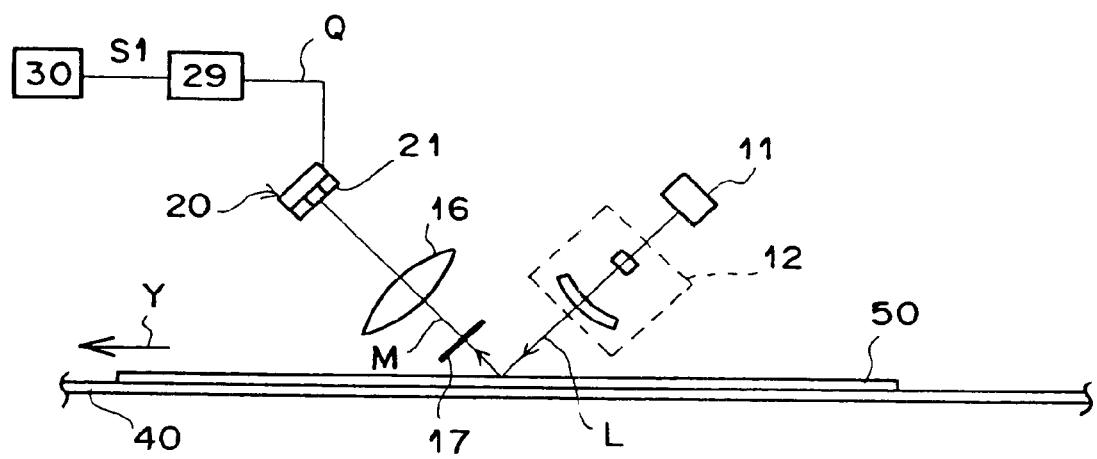
F I G. 10

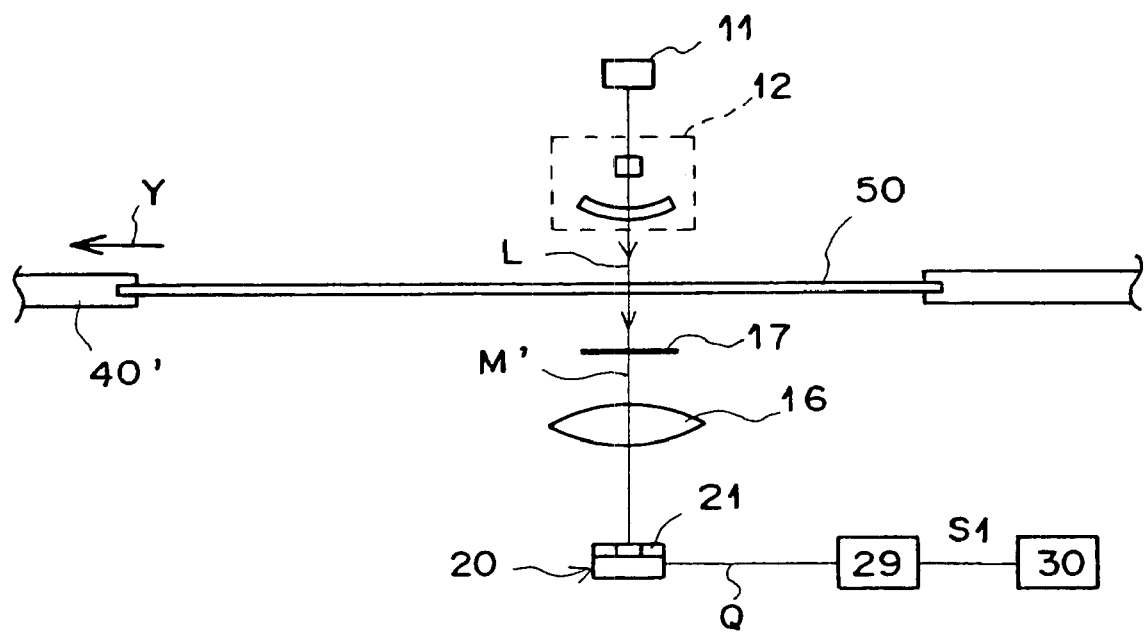
F I G. 11

RADIATION IMAGE READ-OUT APPARATUS

BACKGROUND OF THE INVENTION

1. Field of the Invention

The present invention relates to a radiation image read-out apparatus, and more specifically, to a radiation image read-out apparatus for reading an image recorded on a stimulable phosphor sheet using a line sensor.

2. Description of the Related Art

Heretofore, there have been widely used radiation image recording and reproducing systems utilizing stimulable phosphors. Specifically, a radiation image of an object (e.g., a human body) is recorded on a stimulable phosphor sheet, which includes a substrate and a layer of the stimulable phosphor overlaid on the substrate. A beam of stimulating light (e.g., a laser beam or a beam of visible light) is variably deflected to scan individual pixels of the radiation image recorded on the stimulable phosphor sheet. The beam of the stimulating light causes each pixel to emit stimulated emission light in proportion to the amount of radiation energy stored thereon. The light emitted successively from the individual pixels of the radiation image recorded on the stimulable phosphor sheet is photoelectrically detected and converted into an electric image signal by photoelectric read-out means. After the entire surface of the stimulable phosphor sheet is scanned, the stimulable phosphor sheet is exposed to erasing light so that the radiation energy remaining thereon is completely released.

The image signal, which has been obtained by the radiation image recording and reproducing system, is then subjected to image processing. The image processing may include gradation processing, processing in the frequency domain, etc., for reproducing the radiation image in a visible form having image quality high enough to serve as an effective tool in conducting efficient and accurate diagnosis of a diseased portion. The visible image for diagnosis reproduced from the image signal may be printed on a film or may be displayed on a high resolution cathode ray tube (CRT) display device. After the erasing light releases the residual radiation energy on the stimulable phosphor sheet, the stimulable phosphor sheet may be reused for recording of another radiation image.

Novel radiation image read-out apparatuses for use in the radiation image recording and reproducing systems as described above have been proposed in, e.g., Japanese Unexamined Patent Publications Nos. 60(1985)-11568, 60(1985)-236354 and 1(1989)-101540. The radiation image read-out apparatuses in the above listed publications are directed to shortening the time required for detecting the stimulated emission light, to downsizing the apparatus, and to realizing a lower operation cost. To achieve those objects, each of the proposed radiation image read-out apparatuses includes a linear light source as the stimulating light source for irradiating the stimulable phosphor sheet with a linear beam of the stimulating light, and a line sensor as the photoelectronoc read-out means having a plurality of photoelectronic conversion elements aligned parallel to a linear beam spot of the stimulating light on the stimulable phosphor sheet. Each of the proposed radiation image read-out apparatuses also includes scanning means for moving the linear light source and the line sensor relative to the stimulable phosphor sheet in directions substantially perpendicular to the linear beam spot on the stimulable phosphor sheet.

The proposed radiation image read-out apparatus utilizing the line sensor may further comprise an array of lenses providing certain refraction index distribution, e.g., an array of SELFOC lenses (registered trademark) or rod lenses, to sufficiently focus the stimulated emission light emitted from the stimulable phosphor sheet onto the line sensor. Such an array of lenses providing certain refraction index distribution realizes one-to-one correspondence between the size of the recorded image and the size of the obtained image. The individual lenses in the array are arranged in accordance with the arrangement of the photoelectronic conversion elements on the line sensor. For example, if the photoelectronic conversion elements are arranged on the line sensor as shown in FIG. 2, the individual lenses in the array will be arranged as shown in FIG. 3.

However, as is clear from FIG. 3, the array of the lenses providing certain refraction index distribution naturally includes non-aperture regions, i.e., those regions among the lenses. The non-aperture regions are lower in transmittance of the stimulated emission light than aperture regions (or lens regions). Some portion of the stimulated emission light emitted from the stimulable sheet passes the non-aperture regions while the other portion of the stimulated emission light passes the aperture regions before reaching the line sensor. Therefore, a spurious stripe pattern having a pitch corresponding to the pitch of the non-aperture regions may appear on an image reproduced from the image signal obtained by the radiation image read-out apparatus. Each stripe will be perpendicular to the length direction of the line sensor.

SUMMARY OF THE INVENTION

An object of the present invention is to provide a radiation image read-out apparatus capable of removing from a read-out image a spurious stripe pattern due to non-aperture regions of the lens array.

According to the first aspect of the present invention, there is provided a radiation image read-out apparatus comprising: a linear light source for irradiating a stimulable phosphor sheet carrying a radiation image recorded thereon with a linear beam of stimulating light; a line sensor comprising a plurality of photoelectric conversion elements arranged parallel to a linear area on the stimulable phosphor sheet irradiated with the linear beam of the stimulating light, each of said photoelectric conversion elements being capable of photoelectrically converting stimulated emission light received thereon, said stimulated emission light being emitted from the linear area on the stimulable phosphor sheet irradiated with the linear beam or from a corresponding linear area on the opposite side of the stimulable phosphor sheet; focusing means located between the stimulable phosphor sheet and the line sensor for focusing the stimulated emission light onto each of the photoelectric conversion elements, said focusing means including a lens array; scanning means for moving the linear light source and the line sensor relative to the stimulable phosphor sheet in a direction not parallel to the linear area on the stimulable phosphor sheet irradiated with the linear beam of the stimulating light; read-out means for deriving an image signal representing the radiation image recorded on the stimulable phosphor means from the electric signal outputted by the line sensor while the linear light source and the line sensor is moved relative to the stimulable phosphor sheet; and spurious pattern removing means for obtaining a processed image signal by removing from the image signal a spurious pattern signal due to non-aperture regions on the lens array.

The linear light source may be a light source having a linear shape by itself, such as a fluorescent lamp, a cold cathode fluorescent lamp or an LED array. Otherwise, the linear light source may be a light source which does not have a linear shape by itself but is capable of emitting a linear beam, such as a broad area laser. Although the linear beam of the stimulating light emitted by the linear light source may be either of a continuous beam or a pulse-like beam, use of the pulse-like beam is preferred in order to reduce resultant noise.

It is preferable to make the length of the beam spot of the linear beam of the stimulating light equal to or longer than the length of one side of the stimulable phosphor sheet. The linear area on the stimulable phosphor sheet irradiated with the linear beam of the stimulating light may be aligned parallel to the side of the stimulable phosphor sheet, or may be defined at a certain angle with respect to the side of the stimulable phosphor sheet.

It is preferable to provide between the linear light source and the stimulable phosphor sheet an optical system for focusing the linear beam of the stimulating light onto the surface of the stimulable phosphor sheet. The optical system may include a cylindrical lens, a slit, a lens array of lenses providing certain refraction index distribution, a fluorescence inducing sheet, a bundle of optical fibers, and any appropriate combination thereof. In the case where the wavelength of the desired second order stimulating light for the selected stimulable phosphor sheet is approximately 600 nm, a desired fluorescence inducing sheet is a sheet of a glass material or a polymer containing $Eu^{3+}$ as a phosphor activator.

It is preferable that the linear area on the stimulable phosphor sheet irradiated with the linear beam of the stimulating light has a width of 10–4000 $\mu$m.

Used as the line sensor may be, for example, an amorphous silicon sensor, a CCD sensor, a CCD with a back illuminator, or a MOS image sensor.

The lens array in the focusing means is preferably such a lens array providing certain refraction index distribution.

In addition, the lens array of the focusing means may be, for example, an array of SELFOC lenses or rod lenses. Such an array of lenses sufficiently focuses the stimulated emission light emitted from the stimulable phosphor sheet onto the line sensor by providing certain refraction index distribution which realizes one-to-one correspondence between the size of the recorded image and the size of the obtained image. Each of the lenses is made of a glass material or a polymer.

The focusing means including the lens array may further comprise additional elements for improving focusing ability thereof. Such additional elements may include a cylindrical lens, a slit, a bundle of optical fibers, and any appropriate combination thereof.

It is preferable that the radiation image read-out apparatus further comprises a stimulating light cutting filter (e.g., a sharp-cut filter or a band pass filter), which transmits the stimulated emission light but blocks the stimulating light, for preventing the stimulating light from reaching the line sensor.

A light receiving surface of each of the photoelectric conversion elements on the line sensor is smaller in each dimension than the width of a linear beam spot thereon of the stimulated emission light. A plurality of photoelectric conversion elements are arranged over a length equal to or longer than the linear beam spot of the stimulated emission light.

The line sensor may be of a multi-line configuration, i.e., may include plural lines of the photoelectric conversion elements. Four to twelve lines are especially preferred. In this case, the photoelectric conversion elements constituting the line sensor may be arranged in either of a matrix-like arrangement, an arrangement staggered perpendicular to the length direction of the line sensor, an arrangement staggered parallel to the length direction of the line sensor, or an arrangement staggered in both of the two directions. In either case, it is preferred to arrange individual lenses in the lens array in an arrangement corresponding to the arrangement of the photoelectric conversion elements on the line sensor.

In the case where the line sensor includes so many photoelectric conversion elements that the effect of read-out rate is not any more negligible, it is preferable to allot a storage element to each of the photoelectric conversion elements so that the charges generated by the photoelectric element are stored temporarily in the allotted storage element thereof.

The line sensor preferably includes more than one thousand photoelectric conversion elements per line. The length of the line sensor is preferably equal to or longer than the length of one side of the stimulable sheet.

The direction in which the scanning means moves the linear light source and the line sensor relative to the stimulable phosphor sheet is preferably the width direction of the line sensor (i.e., the direction perpendicular to the length direction of the line sensor). However, in the case where each of the lengths of the linear light source and the line sensor is larger than the length of one side of the stimulable sheet, the scanning means may instead move the linear light source and the light source in a direction fixed at a certain angle with respect to the length direction as far as the linear light source remains capable of irradiating the entire surface of the stimulable sheet. Otherwise, the linear light source and the line sensor may be moved in a zigzag motion.

The linear light source and the line sensor may be arranged either on the same side or on the opposite sides of the stimulable phosphor sheet. In the case where the linear light source and the line sensor are arranged on the opposite sides, a substrate of the stimulable phosphor sheet must be made of a material which transmits the stimulated emission light, so that the stimulated emission light induced by the linear light source is appropriately transmitted toward the line sensor.

It is preferred that the spurious pattern removing means in the radiation image read-out apparatus comprises: spurious pattern signal calculating means for calculating a spurious pattern signal representing a spurious pattern due to non-aperture regions of the lens array based on arrangement of the non-aperture regions on the lens array; a memory for storing the calculated spurious pattern signal; and image modification means for modifying the image signal using the spurious pattern signal.

The spurious pattern signal is a one-dimensional signal representing a spurious pattern in the length direction of the lens array.

It is still more preferred that the spurious pattern removing means comprises: a memory for storing a standard image signal representing an image of uniform radiation recorded on the stimulable phosphor sheet; and an image modification means for modifying the image signal based on the standard image signal.

The standard image signal is a two-dimensional signal representing a spurious pattern over the entire surface of the stimulable phosphor sheet.

Using the radiation image read-out apparatus of the present invention, the quality of the read-out image is improved as the spurious stripe pattern due to the non-aperture regions of the lens array is removed from the read-out image.

In the case where the line sensor includes plural lines of the photoelectric conversion elements, the detection efficiency of the line sensor is also improved as the entire light receiving area for the stimulated emission light is increased.

In the case where the one-dimensional spurious pattern signal is used for modifying the image signal, the entire apparatus may be realized with a relatively simple configuration as required capacity of the memory for storing the one-dimensional spurious pattern signal is relatively small.

In the case where the two-dimensional standard image signal is used for modifying the image signal, the required capacity of the memory will be relatively large. However, the two-dimensional standard image signal includes effects of unevenness of the base radiation (pixel-by-pixel unevenness), sensitivity of the stimulable sheet (pixel-by-pixel unevenness), the stimulating light (line-by-line unevenness), efficiency of the stimulated emission light reaching the line sensor (line-by-line unevenness), and sensitivity of each photoelectric conversion elements on the line sensor (line-by-line unevenness). Therefore, use of the two-dimensional standard image signal has an advantage of canceling all those effects on the read-out image.

BRIEF DESCRIPTION OF THE DRAWINGS

FIG. 5 shows the profile of the ideal image signal to be obtained along the horizontal direction in FIG. 4, FIG. 6 shows a possible profile of an image signal actually obtained along the horizontal direction in FIG. 4, FIG. 7 shows an example of a profile of a spurious pattern signal, FIG. 10 shows a structure of a radiation image read-out apparatus according to another embodiment of the present invention, and FIG. 11 shows a structure of a radiation image read-out apparatus according to still another embodiment of the present invention.

DESCRIPTION OF THE PREFERRED EMBODIMENTS

Now, specific embodiments of the present invention will be described with reference to the accompanying drawings.

Figure 1A:
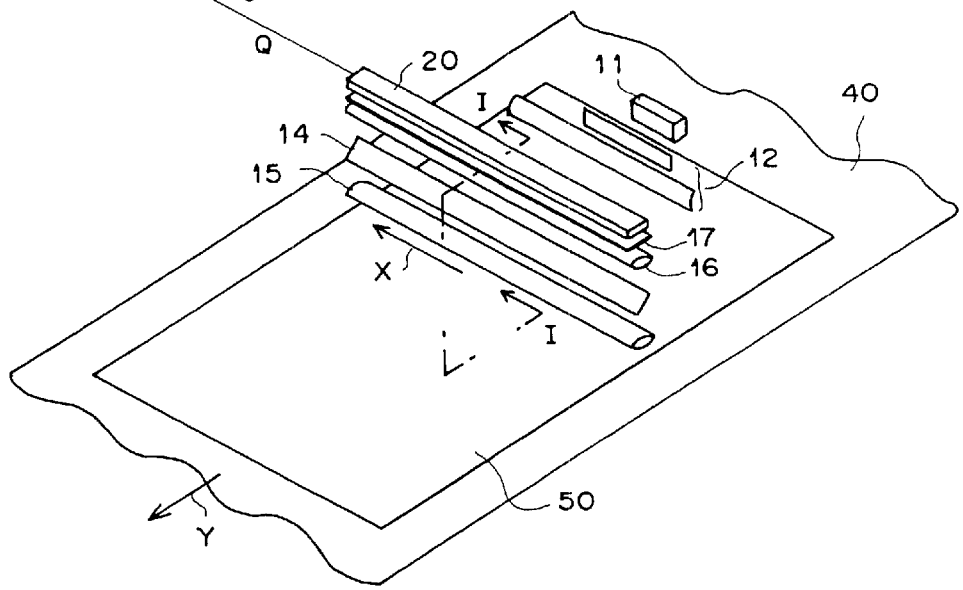
FIGS. 1A and 1B show a structure of a radiation image read-out apparatus according to one embodiment of the present invention.
Figure 1B:
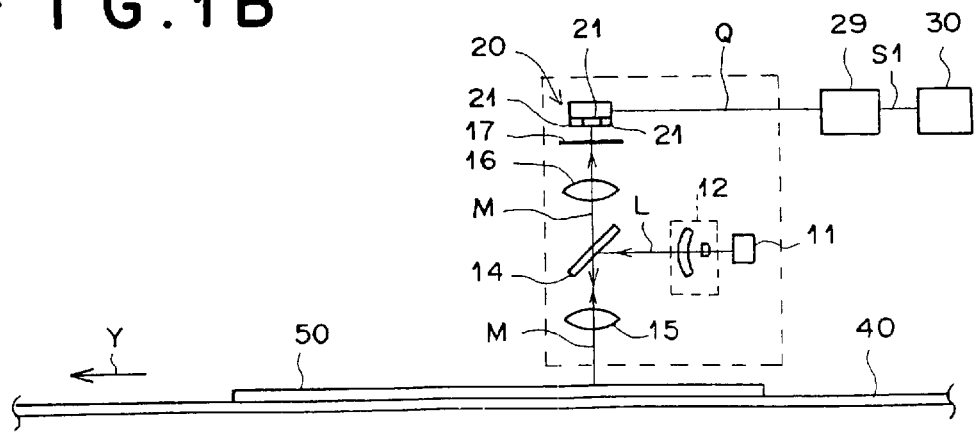
Figure 2:
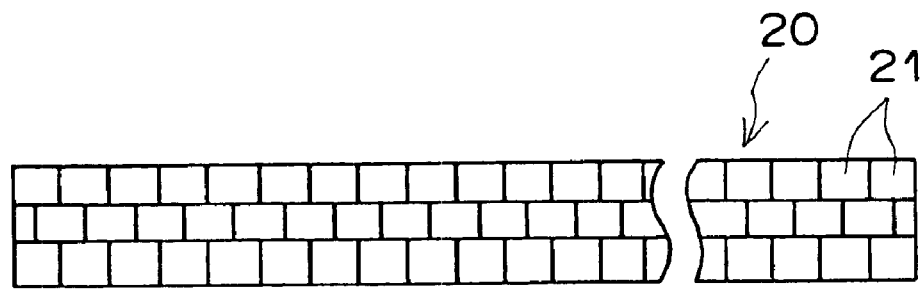
FIG. 2 shows a detailed structure of a line sensor.

FIGS. 1A and 1B show a structure of a radiation image read-out apparatus according to one embodiment of the present invention, wherein FIG. 1A is a perspective view and FIG. 1B is a sectional view along the line I—I in FIG. 1A. FIG. 2 shows a detailed structure of a line sensor 20 included in the radiation image read-out apparatus shown in FIGS. 1A and 1B.

The radiation image read-out apparatus shown in FIGS. 1A and 1B includes a conveyer belt 40, a broad area laser 11 (hereinafter, referred to as "the BLD 11"), an optical system 12, a dichroic mirror 14, a lens array 15 of lenses providing certain refraction index distribution (hereinafter, referred to as "the first SELFOC lens array 15"), a second SELFOC lens array 16, a stimulating light cutting filter 17, a line sensor 20, read-out means 29 and processing means 30. The conveyer belt 40 transfers a stimulable phosphor sheet 50 (hereinafter, referred to simply as "the sheet 50"), on which a radiation image is recorded, in the direction indicated by the arrow Y in FIGS. 1A and 1B. The BLD 11 generates a linear beam of second order stimulating light (hereinafter, referred to simply as "the stimulating light") L having a width of about 100 $\mu$m. The linear beam of the stimulating light L is emitted in a direction substantially parallel to the surface of the sheet 50. The optical system 12 includes a collimator lens for collecting the linear beam of the stimulating light L emitted by the BLD, and a toric lens for expanding the linear beam only in a single direction. The dichroic mirror 14, which is fixed at the angle of 45° with respect to the surface of the sheet 50, reflects the linear beam of the stimulating light L while transmitting a beam of stimulated emission light M described later. The first SELFOC lens array 15 focuses the linear beam of the stimulating light L onto an linear area extending in the direction parallel to the arrow X on the sheet 50. The width of the linear area on the sheet 50 is about 100 $\mu$m. The first SELFOC lens array 15 also collimates the beam of the stimulated emission light M emitted in proportion to the amount of radiation energy stored on the sheet 50. The second SELFOC lens array 16 focuses the collimated beam of the stimulated emission light M after passing the dichroic mirror 14 onto the light receiving surface of the line sensor 20. The stimulating light cutting filter 17 is provided for cutting a fraction of the stimulating light L mixed into the beam of the stimulated emission light M while transmitting the beam of the stimulated emission light M itself, as the fraction of the stimulating light L after being reflected at the surface of the sheet 50 may mix into the beam of the stimulated emission light M after passing the second SELFOC lens array 16. Arranged on the line sensor 20 are a plurality of photoelectric conversion elements 21, each capable of converting a fraction of the stimulated emission light M received thereon into an electrical signal. The read-out means 29 obtains an image signal S1 representing the radiation image recorded on the sheet 50 by reading the electrical signals outputted by individual photoelectric conversion elements 21 while the sheet 50 is transferred in the direction Y. The processing means 30 removes a spurious pattern (e.g., a spurious stripe pattern) on the image signal S1.

The optical system 12 including the collimator lens and the toric lens expands the linear beam of the stimulating light L emitted by BLD 11, so that the beam size of the stimulating light L matches with a desired size of an irradiation area on the dichroic mirror 14.

To be precise, the line sensor 20 in the present embodiment includes three lines of elements, each line including multiple photoelectric conversion elements 21 aligned in the X direction in FIG. 2. Three lines of the multiple photoelectric conversion elements 21 are arranged in a staggered arrangement keeping the length directions thereof fixed perpendicular to the direction of transferring the sheet 50 (i.e., the Y direction). Each of the photoelectric conversion elements 21 has a light receiving surface of about 100 $\mu$m×100 $\mu$m. That is to say, each photoelectric conversion element 21 is capable of receiving a fraction of the stimulated emission light M emitted from an area of about 100 $\mu m \times 100 \mu m$ on the sheet 50. The line sensor 20 may be, for example, an amorphous silicon sensor, a CCD sensor or a MOS image sensor.

Figure 3:
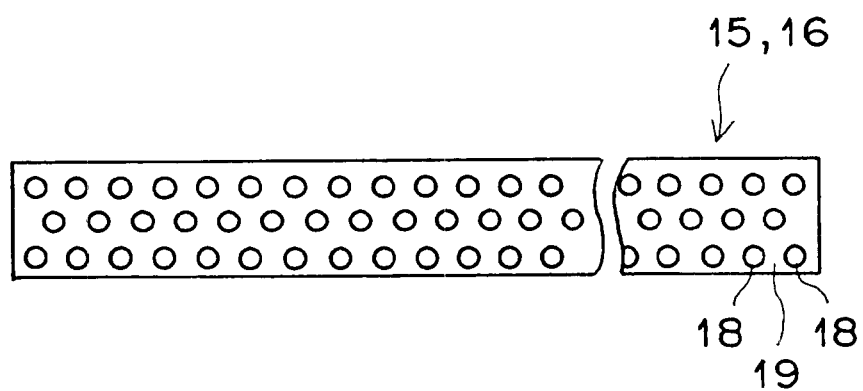
FIG. 3 shows a detailed structure of a lens array of the SELFOC lenses.

Each of the first and second SELFOC lens arrays 15 and 16 is configured as shown in FIG. 3, in which a plurality of lenses 18 providing certain refraction index distribution are arranged in a staggered arrangement corresponding to the arrangement of the photoelectric conversion elements 21 on the line sensor 20. The first SELFOC lens array 15 realizes one-to-one correspondence between the size of the area emitting stimulated emission light M on the sheet 50 and the size of a corresponding image obtained on the dichroic mirror 14. Likewise, the second lens array 16 of SELFOC lenses realizes one-to-one correspondence between the size of the above image obtained on the dichroic mirror 14 and the size of a corresponding image obtained on the light receiving surface of the line sensor 20.

The processing means 30 includes a first memory 31 for storing the image signal Si representing the radiation image recorded on the sheet 50, spurious pattern signal calculating means 32 for calculating a spurious pattern signal S2 representing the spurious pattern due to the non-aperture regions 19 of the first and second SELFOC lens arrays 15 and 16, a second memory 33 for storing the spurious pattern signal S2, and image modification means 34. The image modification means 34 modifies the image signal S1 using the spurious pattern signal S2 to obtain a processed image signal S3 free from any spurious pattern signal.

Figure 4:
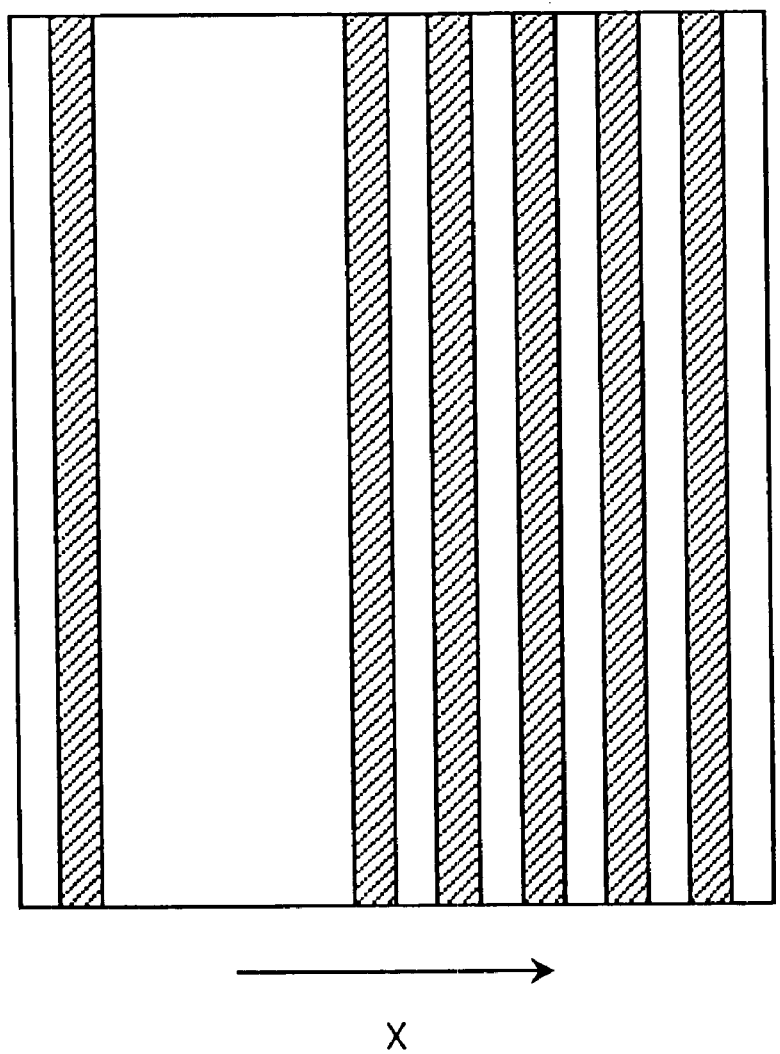
FIG. 4 shows an example of a CTF chart recorded on a stimulable phosphor sheet.

As shown in FIG. 3, the first and second SELFOC lens arrays 15 and 16 naturally includes the non-aperture regions 19, i.e., the regions among the lenses. The non-aperture regions 19 are lower in transmittance of the stimulated emission light M emitted from the sheet 50 than the regions where the lenses 18 reside. Some portion of the stimulated emission light M emitted from the sheet 50 passes the non-aperture regions 19 while the other portion of the stimulated emission light M passes the lenses 18 before reaching the line sensor 20. Therefore, a spurious stripe pattern having a pitch corresponding to the pitch of the non-aperture regions 19 may appear on an image reproduced from the image signal S1 obtained by the line sensor 20. Each stripe of the spurious stripe pattern is perpendicular to the length direction of the line sensor 20. For example, when the sheet 50 recording a CTF chart shown in FIG. 4 is irradiated with the linear beam of the stimulating light L, the profile of the ideal image signal to be obtained along the horizontal direction in FIG. 4 will be the profile shown in FIG. 5. However, a profile of an actually obtained image signal Si will be affected by the above spurious stripe pattern as shown in FIG. 6, when using the first and second SELFOC lens arrays 15 and 16. Such a spurious pattern signal included in the image signal S1 deteriorates the quality of the final reprocessed image.

To avoid such deterioration of the image quality, the image modification means 34 in the present embodiment modifies the image signal Si using the spurious pattern signal S2 to obtain the processed image signal S3 free from any spurious pattern signal. The spurious pattern signal S2 representing the spurious pattern due to the non-aperture regions 19 is calculated by the spurious pattern signal calculating means 32.

As the pitch of the non-aperture regions 19 on the first and second SELFOC lens arrays 15 and 16 is known, the positions on the processed image where the effect of the spurious pattern is expected are predictable. Also known is a difference between the light transmittance of each lens 18 and the light transmittance at each non-aperture region 19. The spurious pattern signal calculating means 32 uses the above two known parameters, i.e., the pitch of the non-aperture regions 19 and the difference between the above two values of the light transmittance, in deriving a one dimensional spurious pattern signal S2 as shown in FIG. 7. Note that positions of peaks in the one dimensional spurious pattern signal S2 shown in FIG. 7 do not correspond with positions of peaks in FIG. 6.

Intensity of the spurious stripe pattern due to the non-aperture regions 19 depends on several imaging conditions and read-out conditions, e.g., intensity of the base radiation used for recording the radiation image on the sheet 50 and intensity of the stimulating light L. Therefore, the image modification means 34 uses a parameter k for adjusting the level of the spurious pattern signal S2 in deriving the processed image signal S3. That is to say, the image modification means 34 calculates the processed image signal S3 using the equation $$S3=S1/(k \cdot S2), \tag{1}$$

wherein the calculation is carried out separately for each one-dimensional image signal S1 representing an image strip carried by a line of pixels.

Now, operation of the radiation image read-out apparatus according to the present embodiment will be described in detail.

First of all, the conveyer belt 40 starts forwarding the sheet 50 laid thereon in the direction indicated by the arrow Y. The sheet 50 carries the radiation image recorded thereon.

During forwarding of the sheet 50, the BLD 11 emits the linear beam of the stimulating light L in the direction substantially parallel to the surface of the sheet 50. The linear stimulating light L is then collimated by the optical system 12 including the collimator lens and the toric lens, reflected by the right angle toward the sheet 50 by the dichroic mirror 14, and focused by the first SELFOC lens array 16 onto a linear area on the sheet 50 extending parallel to the direction indicated by the arrow X.

The linear beam of the stimulating light L focused onto the linear area on the sheet 50 stimulates the stimulable phosphor residing in the linear area. The linear beam of the stimulating light L also travels into the sheet 50 and is dispersed into an adjacent region of the above linear area to stimulate the stimulable phosphor residing therein. Accordingly, intensity of the stimulated emission light M reflects the image information carried by the above linear area and the adjacent region thereof.

The beam of the stimulated emission light M emitted from the sheet 50 is then collimated by the first SELFOC lens array 15, passes through the dichroic mirror 14, and is focused by the second SELFOC lens array 16 onto the light receiving surfaces of the individual photoelectric conversion elements 21. Before the beam of the stimulated emission light M reaches the light receiving surfaces of the individual photoelectric conversion elements 21, the stimulating light cutting filter 17 cuts a fraction of the stimulating light L mixed into the beam of the stimulated emission light M, the fraction having been reflected on the surface of the sheet 50.

A fraction of the stimulated emission light M received by each photoelectric conversion element 21 of the line sensor 20 is converted to an electric signal Q. The read-out means 29 receives all the electric signals Q as input signals, and further converts each electric signal Q, which is an analog signal, to a digital signal. After the entire surface of the sheet 50 is scanned, the read-out means 29 integrates all the electric signals Q to output the image signal S1 representing the entire radiation image recorded on the sheet 50. The outputted image signal S1 is then stored in the first memory 31 in the processing means 30.

The spurious pattern signal S2, which is a one-dimensional signal, has been calculated in advance by the spurious pattern signal calculating means 32 and been stored in the second memory 33. The image modification means 34 reads the image signal S1 and the spurious pattern signal S2 from the first memory 31 and the second memory 33, respectively, and calculates the processed image signal S3 free from any spurious pattern signal on a pixel-by-pixel basis using the equation (1). The processed image signal S3 is inputted to image processing means (not shown in the figures) where the processed image signal S3 is further processed for desired image reproduction.

As described so far, the radiation image read-out apparatus according to the present embodiment provides a read-out image of high quality reproduced from the processed image signal S3 free from any spurious pattern signal.

Figure 8:
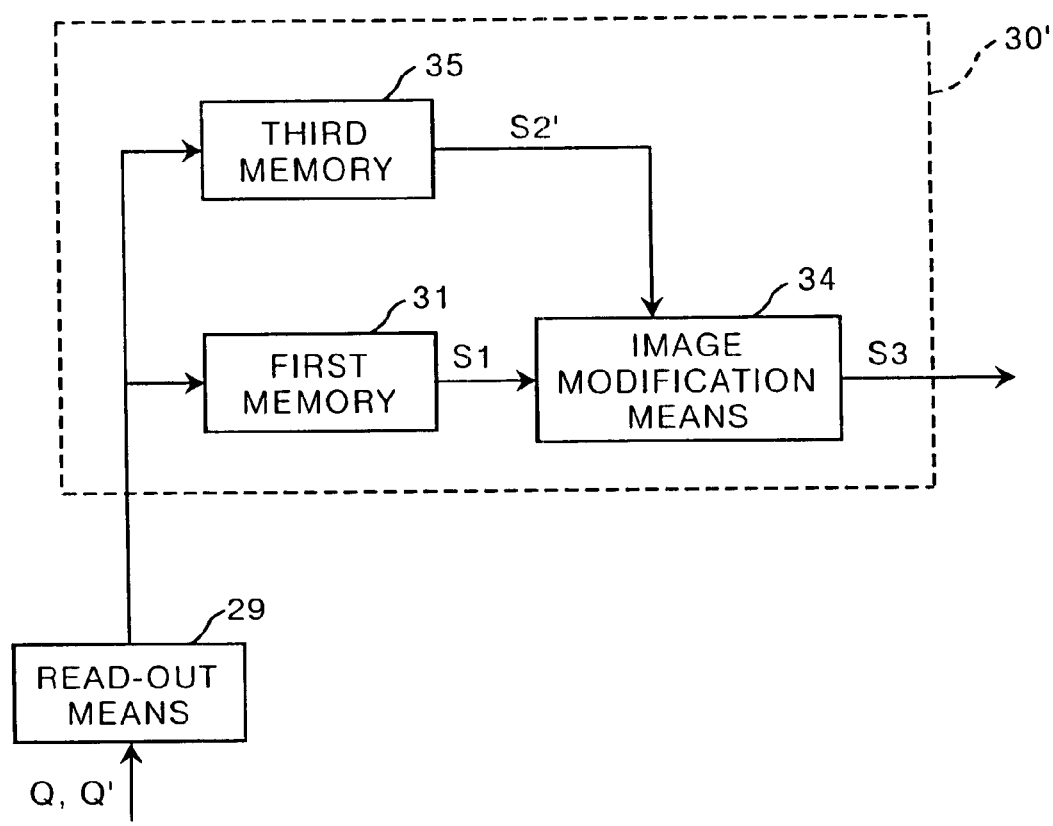
FIG. 8 is a block diagram schematically illustrating another embodiment of processing means, FIGS. 9A, 9B, 9C and 9D each shows a different arrangement of photoelectric conversion elements on the line sensor.

Although the one-dimensional spurious pattern signal S2 calculated by the spurious pattern signal calculating means 32 is used in the above embodiment, another type of the spurious pattern signal, S2', may instead be used. The spurious pattern signal S2' is a two-dimensional signal derived by reading the image of uniform radiation recorded in advance on the stimulable phosphor sheet 50. FIG. 8 is a block diagram schematically showing a configuration of processing means 30' for modifying the image signal S1 now using the spurious pattern signal S2'. As shown in FIG. 8, the processing means 30' includes a third memory 35, which substitutes for the second memory 33 and the spurious pattern signal calculating means 32 in the processing means 30, for storing the spurious pattern signal S2'.

Now, the process carried out by the processing means 30' shown in FIG. 8 will be described.

First of all, the read-out means 29 receives an input signal Q' from the line sensor 20. The signal Q' is such a signal representing an image strip of the image of the uniform radiation recorded on the stimulable phosphor sheet 50. The read-out means 29 converts the electric signal Q', which is an analog signal, to a digital signal. After the entire surface of the sheet 50 is scanned, the read-out means 29 integrates all the electric signals Q' to output the spurious pattern signal S2' representing the entire image of the uniform radiation recorded on the sheet 50. The outputted spurious pattern signal S2' is then stored in the third memory 35 in the processing means 30'. As each of the image signal S1 and the spurious pattern signal S2' represents a two-dimensional image, an appropriate position-matching operation must be carried out between the two images. Thus, use of a marker or a notch is preferred when recording a radiation image on the sheet 50.

After the image signal S1 is obtained and stored in the memory 31, the image modification means 34 reads the image signal S1 and the spurious pattern signal S2' from the first memory 31 and the third memory 35, respectively, and calculates a processed image signal S3 free from any spurious pattern signal on a pixel-by-pixel basis using the above equation (1). The processed image signal S3 is inputted to image processing means (not shown in the figures) where the processed image signal S3 is further processed for desired image reproduction.

Accordingly, the radiation image read-out apparatus using the processing means 30' shown in FIG. 8 also provides a read-out image of high quality reproduced from the processed image signal S3 free from any spurious pattern signal.

The spurious pattern signal S2' includes effects of unevenness of the base radiation (pixel-by-pixel unevenness), sensitivity of the sheet 50 (pixel-by-pixel unevenness), the stimulating light L (line-by-line unevenness), efficiency of the stimulated emission light M reaching the line sensor 20 (line-by-line unevenness), and sensitivity of each photoelectric conversion elements 21 on the line sensor 20 (line-by-line unevenness). Therefore, use of the spurious pattern signal S2' in modifying the image signal S1 has an advantage of canceling all those effects.

In alternative embodiments of the present invention, any of known configurations may be adopted for the linear light source, the focusing optical system between the line light source and the sheet, the optical system between the sheet and the line sensor, the line sensor and the processing means. Further, the radiation image read-out apparatus may include additional components, such as image processing means for further processing the processed image signal for desired image reproduction and erasing means for releasing the residual radiation image on the stimulable phosphor sheet.

Figure 9A:
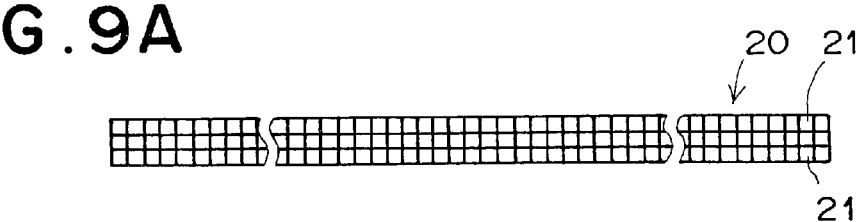
Figure 9B:
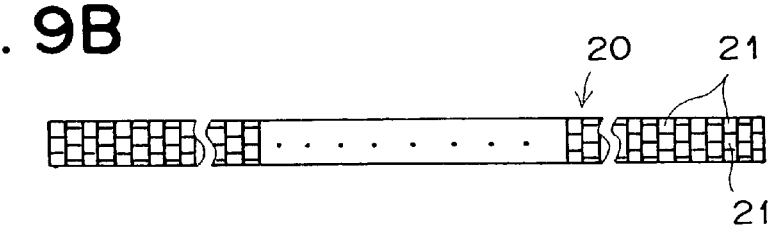
Figure 9C:
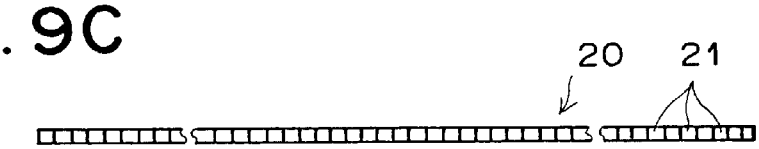
Figure 9D:
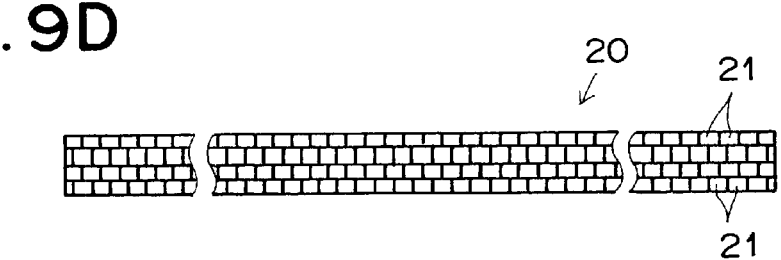

Although the line sensor 20 according to the above embodiment employs the arrangement of the photoelectric conversion elements 21 staggered parallel to the length direction as shown in FIG. 2, the line sensor 20 may instead employ a matrix-like arrangement (see FIG. 9A) or an arrangement staggered perpendicular to the length direction (see FIG. 9B). The line sensor 20 may instead be a simple line sensor consisting of only one line of the photoelectric conversion elements 21 as shown in FIG. 9C. In a preferred arrangement, four lines of the photoelectric conversion elements 21 area arranged staggered parallel to the length direction thereof as shown in FIG. 9D. It is preferred to arrange the photoelectric conversion elements 21 on four to twelve lines. In any case, each of the first and second SELFOC lens arrays 15 and 16 is required to employ an arrangement of the lenses 18 corresponding to the arrangement of the photoelectric conversion elements 21 on the line sensor 20.

In addition, although the radiation image read-out apparatus according to the above embodiment employs partially overlapping optical paths for the beam of the stimulating light L and the beam of the stimulated emission light M to downsize the entire apparatus, the radiation image read-out apparatus may instead employ completely separated paths as, for example, shown in FIG. 10.

A radiation image read-out apparatus shown in FIG. 10 according to another embodiment of the present invention includes a conveyer belt 40, a BLD 11, an optical system 12, a SELFOC lens array 16, a stimulating light cutting filter 17, a line sensor 20, read-out means 29 and processing means 30. The BLD 11 emits a linear beam of stimulating light L incident on the surface of the sheet 50 at an angle substantially of 45°. The optical system 12 includes a collimator lens for collecting the linear beam of the stimulating light L emitted by BLD, and a toric lens for expanding the linear beam only in a single direction. The SELFOC lens array 16 focuses the beam of the stimulated emission light M emitted from the sheet 50 onto the light receiving surface of the line sensor 20. Herein, the beam of the stimulated emission light M travels along an optical path fixed at an angle substantially of 45° with respect to the surface of the sheet and of 90° with respect to the optical path for the beam of the stimulating light L. The stimulating light cutting filter 17 cuts a fraction of the stimulating light L mixed into the beam of the stimulated emission light M while transmitting the beam of the stimulated emission light M itself. Arranged on the line sensor 20 are a plurality of photoelectric conversion elements 21, each capable of converting a fraction of the stimulated emission light M received thereon into an electrical signal. The read-out means 29 obtains an image signal S1 representing the radiation image recorded on the sheet 50 by reading the electrical signals outputted by individual photoelectric conversion elements 21 while the sheet 50 is transferred. The processing means 30 removes a spurious pattern (e.g., a spurious stripe pattern) on the image signal S1 in the same manner as describe above.

Further, although each of the above embodiments employs a reflection-type configuration, i.e., the configuration in which the source of the stimulating light L and the line sensor are arranged on the same side of the stimulable sheet, the radiation image read-out apparatus may instead employ a transmitting-type configuration as shown in FIG. 11. In the transmitting-type configuration, the source of the stimulating light L and the line sensor are arranged on the opposite sides of the stimulable sheet, so that the beam of the stimulating light incident on one surface of the sheet causes the stimulated emission light to be emitted from the other surface toward the line sensor. When employing the transmitting-type configuration, the substrate of the stimulable phosphor sheet must be made of a material which transmits the stimulated emission light.

A radiation image read-out apparatus shown in FIG. 11 employing the transmitting-type configuration includes a conveyer belt 40', a BLD 11, an optical system 12, a SELFOC lens array 16, a stimulating light cutting filter 17, a line sensor 20, read-out means 29 and processing means 30. The conveyer belt 40' holds the stimulable phosphor sheet 50 only at portions the front and rear edges thereof while transferring the stimulable phosphor sheet 50 in the direction indicated by the arrow Y. Herein, the portions held by the conveyer belt 40' overlap with no portion of the radiation image, or overlap only with those portions outside the region of interest. The BLD 11 emits a linear beam of stimulating light L in a direction substantially perpendicular to the surface of the sheet 50. The optical system 12 includes a collimator lens for collecting the linear beam of the stimulating light L emitted by the BLD 11, and a toric lens for expanding the linear beam only in a single direction. The SELFOC lens array 16 focuses the beam of the stimulated emission light M' emitted from the sheet 50 onto the light receiving surface of the line sensor 20. Herein, the stimulated emission light M' is emitted from the lower surface of the sheet 50 and travels along an optical path substantially perpendicular to each surface of the sheet 50. The stimulating light cutting filter 17 cuts a fraction of the stimulating light L mixed into the beam of the stimulated emission light M' while transmitting the beam of the stimulated emission light M' itself. Arranged on the line sensor 20 are a plurality of photoelectric conversion elements 21, each capable of converting a fraction of the stimulated emission light M' received thereon into an electrical signal. The read-out means 29 obtains an image signal S1 representing the radiation image recorded on the sheet 50 by reading the electrical signals outputted by individual photoelectric conversion elements 21 while the sheet 50 is transferred. The processing means 30 removes a spurious pattern (e.g., a spurious stripe pattern) on the image signal S1 in the same manner as describe above.

What is claimed is:

1. A radiation image read-out apparatus comprising
    a linear light source for irradiating a stimulable phosphor sheet carrying a radiation image recorded thereon with a linear beam of stimulating light,
    a line sensor comprising a plurality of photoelectric conversion elements arranged parallel to a linear area on the stimulable phosphor sheet irradiated with the linear beam of the stimulating light, each of said photoelectric conversion elements being capable of photoelectrically converting stimulated emission light received thereon into an electric signal, said stimulable emission light being emitted from the linear area on the stimulable phosphor sheet irradiated with the linear beam or from a corresponding linear area on the opposite side of the stimulable phosphor sheet,
    focusing means located between the stimulable phosphor sheet and the line sensor for focusing the stimulated emission light onto each of the photoelectric conversion elements, said focusing means including a lens array,
    scanning means for moving the linear light source and the line sensor relative to the stimulable phosphor sheet in a direction not parallel to the linear area on the stimulable phosphor sheet irradiated with the linear beam of the stimulating light,
    read-out means for deriving an image signal representing the radiation image recorded on the stimulable phosphor means from the electric signal outputted by the line sensor while the linear light source and the line sensor is moved relative to the stimulable phosphor sheet, and
    spurious pattern removing means for obtaining a processed image signal by removing from the image signal a spurious pattern signal due to non-aperture regions on the lens array.

2. A radiation image read-out apparatus according to claim 1, wherein
    the line sensor includes plural lines of the photoelectric conversion elements, said lines being arranged parallel to one another.

3. A radiation image read-out apparatus according to claim 2, wherein
    the line sensor includes four to twelve lines of the photoelectric conversion elements.

4. A radiation image read-out apparatus according to claim 2, wherein
    the photoelectric conversion elements on the line sensor are arranged in a staggered arrangement.

5. A radiation image read-out apparatus according to claim 3, wherein the photoelectric conversion elements on the line sensor are arranged in a staggered arrangement.

6. A radiation image read-out apparatus according to claim 1, wherein
    lenses constituting the lens array are arranged in an arrangement corresponding to the arrangement of the photoelectric conversion elements on the line sensor.

7. A radiation image read-out apparatus according to claim 2, wherein
    lenses constituting the lens array are arranged in an arrangement corresponding to the arrangement of the photoelectric conversion elements on the line sensor.

8. A radiation image read-out apparatus according to claim 3, wherein
    lenses constituting the lens array are arranged in an arrangement corresponding to the arrangement of the photoelectric conversion elements on the line sensor.

9. A radiation image read-out apparatus according to claim 4, wherein
    lenses constituting the lens array are arranged in an arrangement corresponding to the arrangement of the photoelectric conversion elements on the line sensor.

10. A radiation image read-out apparatus according to claim 5, wherein lenses constituting the lens array are arranged in an arrangement corresponding to the arrangement of the photoelectric conversion elements on the line sensor.

11. A radiation image read-out apparatus according to claim 1, wherein the lens array provides certain refraction index distribution.

12. A radiation image read-out apparatus according to claim 2, wherein the lens array provides certain refraction index distribution.

13. A radiation image read-out apparatus according to claim 3, wherein the lens array provides certain refraction index distribution.

14. A radiation image read-out apparatus according to claim 4, wherein the lens array provides certain refraction index distribution.

15. A radiation image read-out apparatus according to claim 5, wherein the lens array provides certain refraction index distribution.

16. A radiation image read-out apparatus according to claim 6, wherein the lens array provides certain refraction index distribution.

17. A radiation image read-out apparatus according to claim 7, wherein the lens array provides certain refraction index distribution.

18. A radiation image read-out apparatus according to claim 8, wherein the lens array provides certain refraction index distribution.

19. A radiation image read-out apparatus according to claim 9, wherein the lens array provides certain refraction index distribution.

20. A radiation image read-out apparatus according to claim 10, wherein the lens array provides certain refraction index distribution.

21. A radiation image read-out apparatus according to claim 1, wherein the spurious pattern removing means comprises spurious pattern signal calculating means for calculating a spurious pattern signal representing a spurious pattern due to non-aperture regions of the lens array based on arrangement of the non-aperture regions on the lens array, a memory for storing the calculated spurious pattern signal, and image modification means for modifying the image signal using the spurious pattern signal.

22. A radiation image read-out apparatus according to claim 2, wherein the spurious pattern removing means comprises spurious pattern signal calculating means for calculating a spurious pattern signal representing a spurious pattern due to non-aperture regions of the lens array based on arrangement of the non-aperture regions on the lens array, a memory for storing the calculated spurious pattern signal, and image modification means for modifying the image signal using the spurious pattern signal.

23. A radiation image read-out apparatus according to claim 1, wherein the spurious pattern removing means comprises a memory for storing a standard image signal representing an image of uniform radiation recorded on the stimulable phosphor sheet, and image modification means for modifying the image signal using the standard image signal.

24. A radiation image read-out apparatus according to claim 2, wherein the spurious pattern removing means comprises a memory for storing a standard image signal representing an image of uniform radiation recorded on the stimulable phosphor sheet, and image modification means for modifying the image signal using the standard image signal.

* * * * *